United States Patent
Wu et al.

(10) Patent No.: US 11,748,618 B2
(45) Date of Patent: Sep. 5, 2023

(54) METHODS FOR OBTAINING NORMAL VECTOR, GEOMETRY AND MATERIAL OF THREE-DIMENSIONAL OBJECTS BASED ON NEURAL NETWORK

(71) Applicants: ZHEJIANG UNIVERSITY, Hangzhou (CN); FACEUNITY TECHNOLOGY CO., LTD., Hangzhou (CN)

(72) Inventors: Hongzhi Wu, Hangzhou (CN); Kun Zhou, Hangzhou (CN); Kaizhang Kang, Hangzhou (CN)

(73) Assignees: ZHEJIANG UNIVERSITY, Hangzhou (CN); FACEUNITY TECHNOLOGY CO., LTD., Hangzhou (CN)

(*) Notice: Subject to any disclaimer, the term of this patent is extended or adjusted under 35 U.S.C. 154(b) by 380 days.

(21) Appl. No.: 17/209,258

(22) Filed: Mar. 23, 2021

(65) Prior Publication Data
US 2021/0209340 A1    Jul. 8, 2021

Related U.S. Application Data

(63) Continuation of application No. PCT/CN2019/104257, filed on Sep. 3, 2019.

(51) Int. Cl.
*G06N 3/08*      (2023.01)
*G06V 20/64*    (2022.01)
(Continued)

(52) U.S. Cl.
CPC ............ *G06N 3/08* (2013.01); *G06V 10/764* (2022.01); *G06V 10/82* (2022.01); *G06V 20/64* (2022.01)

(58) Field of Classification Search
CPC .......... G06N 3/045; G06N 3/08; G06T 15/00; G06V 10/764; G06V 10/82; G06V 20/64
See application file for complete search history.

(56) References Cited

U.S. PATENT DOCUMENTS

| 2006/0017720 A1* | 1/2006 | Li | G01B 11/2504 |
| | | | 345/419 |
| 2006/0067573 A1* | 3/2006 | Parr | G06F 18/00 |
| | | | 382/154 |

(Continued)

FOREIGN PATENT DOCUMENTS

| CN | 102087752 A | 6/2011 |
| CN | 102819864 A | 12/2012 |

(Continued)

OTHER PUBLICATIONS

Hendrik P. A. Lensch."A Framework for the Acquisition,Processing and Interactive Display of High Quality 3D Models", Sep. 2001,Tutorial Notes for the DAGM 2001,Research Report,MPI-I-2001-4-005, pp. 5-22.*

(Continued)

*Primary Examiner* — Omar S Ismail
(74) *Attorney, Agent, or Firm* — W&G Law Group

(57) ABSTRACT

A method for obtaining a normal vector, a geometry and a material of a three-dimensional object based on a neural network is provided. The present disclosure provides, based on an idea of "actively irradiating an object with a number of specific patterns, capturing photos at the same time, and obtaining a normal vector of an object by calculating the obtained photos", an acquisition method combined with a neural network. Further, the method uses the obtained normal vector to optimize a model of the object. This method can also obtain material feature information while obtaining the normal vector. Finally, a high-quality geometric result and a high-quality material acquisition result are obtained jointly. The number of illumination patterns obtained by using this method is small, and the normal vector obtained by the method has high accuracy and the method is not limited to a specific acquisition device.

10 Claims, 4 Drawing Sheets

(51) Int. Cl.
  *G06V 10/764* (2022.01)
  *G06V 10/82* (2022.01)

(56) References Cited

U.S. PATENT DOCUMENTS

| | | | |
|---|---|---|---|
| 2007/0127811 A1* | 6/2007 | Luo | G06F 18/28 382/104 |
| 2012/0194517 A1* | 8/2012 | Izadi | G06F 3/011 345/420 |
| 2015/0269427 A1* | 9/2015 | Kim | G06V 20/52 348/159 |
| 2015/0294496 A1* | 10/2015 | Medasani | G06T 15/205 345/420 |
| 2016/0358477 A1* | 12/2016 | Ansari | B60W 30/12 |
| 2017/0123428 A1* | 5/2017 | Levinson | G05D 1/0257 |
| 2017/0124476 A1* | 5/2017 | Levinson | G06V 20/58 |
| 2017/0367766 A1* | 12/2017 | Mahfouz | A61F 2/3859 |
| 2019/0096135 A1* | 3/2019 | Dal Mutto | G06F 18/24765 |
| 2019/0108396 A1* | 4/2019 | Dal Mutto | G06F 18/24 |
| 2019/0204427 A1* | 7/2019 | Abari | G01S 17/86 |
| 2019/0227553 A1* | 7/2019 | Kentley-Klay | B60L 58/12 |
| 2019/0304134 A1* | 10/2019 | Mauchly | G06T 15/20 |
| 2020/0082180 A1* | 3/2020 | Wang | G06T 7/80 |
| 2020/0210726 A1* | 7/2020 | Yang | G06V 10/82 |
| 2020/0342652 A1* | 10/2020 | Rowell | G06V 10/82 |

FOREIGN PATENT DOCUMENTS

| | | |
|---|---|---|
| CN | 108171218 A | 6/2018 |
| CN | 108985333 A | 12/2018 |
| CN | 109147048 A | 1/2019 |

OTHER PUBLICATIONS

Jure Zbontar,"Computing the Stereo Matching Cost with a Convolutional Neural Network," Jun. 2015,Proceedings of the IEEE Conference on Computer Vision and Pattern Recognition (CVPR), 2015,pp. 1592-1597.*

Diego Nehab,"Efficiently Combining Positions and Normals for Precise 3D Geometry",Jul. 1, 2005,ACM Transactions on Graphics,vol. 24,Issue 3,pp. 536-540.*

Kaizhang Kang,"Learning Efficient Photometric Feature Transform for Multi-View Stereo",Oct. 2021, Proceedings of the IEEE/CVF International Conference on Computer Vision (ICCV), 2021,pp. 5956-5960.*

Kaizhang Kang,"Learning Efficient Illumination Multiplexing for Joint Capture of Reflectance and Shape", Nov. 2019 ,ACM Trans. Graph., vol. 38, No. 6, Article 165.,pp. 165:1-165:11.*

Sergey Zagoruyko,"Learning to Compare Image Patches via Convolutional Neural Networks",Jun. 2015, Proceedings of the IEEE Conference on Computer Vision and Pattern Recognition (CVPR), 2015,pp. 4353-4360.*

International Search Report (PCT/CN2019/104257); dated May 26, 2020.

* cited by examiner

METHODS FOR OBTAINING NORMAL VECTOR, GEOMETRY AND MATERIAL OF THREE-DIMENSIONAL OBJECTS BASED ON NEURAL NETWORK

CROSS-REFERENCE TO RELATED APPLICATIONS

This application is a continuation of International Application No. PCT/CN2019/104257, filed on Sep. 3, 2019, the disclosure of which is hereby incorporated by reference in its entirety.

TECHNICAL FIELD

The present disclosure relates to a method for obtaining a normal vector of a three-dimensional object based on neural network, and a geometric optimization method and a material acquisition method that are based on the method for obtaining the normal vector of the three-dimensional object based on neural network, and belongs to the field of computer graphics and computer vision.

BACKGROUND

Digitizing real objects has always been a problem in the field of computer graphics/vision. At present, digitalized real objects can be expressed by three-dimensional meshes and six-dimensional spatially varying bidirectional reflectance distribution function (SVBRDF). Based on this representation, appearance of objects at any viewing angle and under any lighting conditions can be well rendered and obtained.

However, how to obtain reflection information and geometric information of an object simultaneously with high efficiency and high quality is still a big challenge. On the one hand, such high quality requires to obtain as many observation values as possible during measurement. On the other hand, in an actual acquisition process, it is desired that measurement time should be as short as possible. In addition, a high-quality normal vector can optimize a coarse three-dimensional mesh to obtain a fine geometric model. However, there is no method to efficiently obtain normal vector information with a high-quality at present, and this problem is still a big challenge.

Existing methods/systems can better acquire another information if geometry or material is known. For example, technologies such as structured light ((Daniel Scharstein and Richard Szeliski. 2003. High-accuracy stereo depth maps using structured light. In CVPR.) or SFM(structure-from-motion)(Johannes Lutz Schönberger and Jan-Michael Frahm. 2016. Structure-from-Motion Revisited. In CVPR) can be used to collect scenes with less complex reflection properties. For another example, with regarding to a lighting stage used when collecting material properties, it can be assumed that an object is in high beam (Andrew Gardner, Chris Tchou, Tim Hawkins, and Paul Debevec. 2003. Linear light source reflectometry. ACM Trans. Graph. 22, 3 (2003), 749-758), and prior knowledge where the collected object is a certain geometric object can also be used, to simplify difficulty of sampling. Although there are some previous works that simultaneously collect the geometric and material information of objects, these methods also have strong simplifying assumptions. For example, it is supposed that an object is in high beam (Borom Tunwattanapong, Graham Fyffe, Paul Graham, Jay Busch, Xueming Yu, Abhijeet Ghosh, and Paul Debevec. 2013. Acquiring Reflectance and Shape from Continuous Spherical Harmonic Illumination. ACM Trans. Graph. 32, 4, Article 109 (July 2013), 12 pages.), or the material information is isotropic (Rui Xia, Yue Dong, Pieter Peers, and Xin Tong. 2016. Recovering Shape and Spatiallyvarying Surface Reflectance Under Unknown Illumination. ACM Trans. Graph. 35, 6, Article 187 (November 2016), 12 pages), and there is also a case from a perspective of a base material, to simplify the problem by limiting the number of the base materials (Michael Holroyd, Jason Lawrence, and Todd Zickler. 2010. A Coaxial Optical Scanner for Synchronous Acquisition of 3D Geometry and Surface Reflectance. ACM Trans. Graph. 29, 4, Article 99 (July 2010), 12 pages.).

Deep learning is a machine learning method and has been widely used and achieves great success in the fields of computer vision and computer graphics in recent years. This method, by specifying a loss function, and using a gradient descent method, makes a network fit a target function.

SUMMARY

An object of the present disclosure is to address shortcomings in the related art and propose methods for obtaining a normal vector, geometry and material of a three-dimensional object based on a neural network.

An object of the present disclosure is achieved through following technical solutions: a method for obtaining a normal vector of a three-dimensional object based on a neural network, and the method includes following steps:

(1) generating training data, where said generating the training data includes: obtaining parameters of an acquisition device, the parameters including a distance from a light source to an origin of sampling space, an angle from the light source to the origin of the sampling space, a characteristic curve of the light source, a distance from a camera to the origin of the sampling space, an angle from the camera to the origin of the sampling space, and an intrinsic parameter and an extrinsic parameter of the camera; and generating, utilizing the parameters, an acquisition result that simulates an actual camera, as training data;

(2) training the neural network based on the training data obtained in the step (1), wherein the neural network has following characteristics:

a. input of the neural network being a Lumitexel, wherein an incident light from each light source is incident to a sampling point and then is reflected by the sampling point along an observation direction to form a reflected light having a light intensity, and the Lumitexel denotes the light intensity;

b. output of the neural network and a regression target being normal vectors corresponding to the Lumitexel input;

c. a first layer of the neural network including a linear fully connected layer, wherein a parameter matrix of the linear fully connected layer is trained by a following formula:

$$W_l = f_w(W_{raw})$$

where $W_{raw}$ denotes a parameter to be trained; $W_l$ denotes an illumination matrix, with a size of n×m, n is sampling accuracy of Lumitexel, m denotes a number of illumination patterns; and $f_w$ denotes a mapping used to transform $W_{raw}$, so that the generated illumination matrix is capable of corresponding to a possible luminous intensity of the acquisition device;

d. a second layer and subsequent layers being non-linear mapping networks, and a length of an output vector of a last layer is 3; and after the training, the illumination matrix of the first linear fully connected layer of the first layer being taken out; and (3) generating, by the acquisition device, an illumination pattern based on the illumination matrix taken out in step (2), and irradiating a target three-dimensional object in sequence, to obtain a set of photos $r_1, r_2 \ldots, r_m$; traversing pixels and channels of the photos in turn, taking out pixel values of an i-th row, a j-th column, and a k-th channel from each of the $r_1, r_2 \ldots, r_m$ each time, to form a vector $a=a_1, a_2, \ldots, a_m$, taking a as an output vector of the linear fully connected layer of the first layer of the neural network, calculating the output vector of the last layer as a normal vector of a surface of the three-dimensional object corresponding to one of the pixels; and traversing all of the pixels to obtain a feature map of the normal vector of the surface of the three-dimensional object.

Further, in the step (1), a specific method for generating the acquisition result that simulates the actual camera includes: randomly selecting a sampling point in the sampling space where the target three-dimensional object may appear, and randomly sampling material parameters of that point, generating the Lumitexel using a rendering model.

Further, the rendering model adopts a GGX model and is generated through a formula:

$$f_r(\omega_i; \omega_o, n, t, p) = \frac{\rho_d}{\pi} + \rho_s \frac{D_{GGX}(\omega_h; \alpha_x, \alpha_y; t)F(\omega_i, \omega_h)G_{GGX}(\omega_i, \omega_o; \alpha_x, \alpha_y; t)}{4(\omega_i \cdot n)(\omega_o \cdot n)},$$

where $f_r(\omega_i; \omega_o, n, t, p)$ denotes a bidirectional reflection distribution function, $\omega_o$ denotes an emission direction, $\omega_i$ denotes an incident direction, n denotes a normal vector in a world coordinate system, t denotes a direction of an x-axis of a local coordinate system of a sampling point in the world coordinate system, p denotes a material parameter vector and includes $\alpha_x, \alpha_y, \rho_d, \rho_s$, where $\alpha_x$ and $\alpha_y$ denote roughness coefficients, $\rho_d$ denotes a diffuse albedo, and $\rho_s$ denotes a specular albedo; $\omega_h$ denotes a half vector, $D_{GGX}$ denotes a differential surface distribution term, F denotes a Fresnel term, and $D_{GGX}$ denotes a shadow coefficient function.

Further, in the step (2), $f_w$ is a combination of a normalization function and a flip function, m is an even number, a size of $W_{raw}$ is $n \times \dot{m}$, $\dot{m}=m/2$, $W_{raw}$, is regarded as a combination of $\dot{m}$ column vectors and is expressed as follows:

$$W_{raw}=[w_1, w_2, \ldots, w_{\dot{m}}]$$

$f_w$ normalizes each column of $W_{raw}$ to be a unit vector and then flips each column to its negative number so as to form a new vector, and a formula of $f_w$ is expressed as follows:

$$f_w(W_{raw}) = f_{flip}(f_{normalize}(W_{raw})),$$

$$W_{normalized} = f_{normalize}(W_{raw}) = \left[\frac{w_1}{\|w_1\|}, \frac{w_2}{\|w_2\|} \cdots \frac{w_{\dot{m}}}{\|w_{\dot{m}}\|}\right].$$

$W_{normalized}$ is regarded as m column vectors and is expressed as follows:

$$W_{normalized}=[\overline{w}_1, \overline{w}_2, \ldots, \overline{w}_{\dot{m}}],$$

$$W_l=f_{flip}(W_{normalized})=[\max(0.0, \overline{w}_1), \min(0.0, \overline{w}_1), \max(0.0, \overline{w}_2), \min(0.0, \overline{w}_1) \ldots, \max(0.0, \overline{w}_{\dot{m}}), \min(0.0, \overline{w}_{\dot{m}})].$$

Further, in the step (2), one normalization layer is connected to the last layer of the neural network and is configured to normalize the output vector to be a unit vector.

Prediction of material feature information (such as a diffuse reflection feature vector, a specular reflection feature vector) is added in the training of the neural network above. A specific method includes following steps:

(1) surrounding a sampling point using a cube with a side length d and with a center at the origin of the sampling space, and uniformly sampling a plurality of points on each surface as virtual light sources;

(2) generating the material feature vector through a formula:

$$V(l,P)=F_{near}(x_l, x_p, \omega_p, n_l)I(l)f_r(\omega_i; \omega_o, n_p, t, p),$$

where I denotes luminescence information of each of the virtual light sources l and includes: a spatial position $x_l$ of the virtual light source l, a normal vector $n_l$ of the virtual light source l, a luminous intensity I(l) of the virtual light source l; and P includes parameter information of the sampling point, including: a spatial position $x_p$ of the sampling point, a normal vector $n_p$ in a world coordinate system, a material parameter p of the sampling point in a direction t of an x-axis of a local coordinate system in the world coordinate system, and p includes $\alpha_x, \alpha_y, \rho_d, \rho_s$, where $\alpha_x$ and $\alpha_y$ represent roughness coefficients, $\rho_d$ represents a diffuse albedo, $\rho_s$ represents a specular albedo; $\omega_i$ represents an incident vector in the world coordinate system, $\omega_o$ represents an emission vector in the world coordinate system; $f_r(\omega_i; \omega_o, n_p, t, p)$ is a bidirectional reflection distribution function, $F_{near}(x_l, x_p, \omega_l, n_p, n_l)$ is a near field factor and is represented by a formula:

$$F_{near}(x_l, x_p, \omega_i, n_p, n_l) = \frac{1}{\|x_l - x_p\|^2}(\omega_i \cdot n_p)(-\omega_i \cdot n_l),$$

(3) setting the specular albedo of the sampling point to 0, to generate a diffuse reflection feature vector $v_d$;

(4) setting the diffuse albedo to 0, to generate a specular reflection feature vector $v_s$;

(5) additionally outputting, by the neural network, vectors $v'_d, v'_s, p'$, where $v'_d$ has a same length as $v_d$, $v'_s$ has a same length as $v_s$, p' has a length of 3, the vectors $v'_d, v'_s, p'$ are respectively a prediction of the diffuse reflection feature vector $v_d$ after the near field factor is eliminated, a prediction of the specular reflection vector $v_s$ after the near field factor is eliminated, and a prediction of the spatial position $x_p$;

(6) a loss function of a material feature part being expressed as follows:

$$Loss_{diffuse}=\|V'_d F_{near}(x_b p', \omega'_i, n', n_l) - v_d\|,$$

$$Loss_{specular}=\|v'_s F_{near}(x_b p', \omega'_i, n' n_l) - v_s\|,$$

when training the neural network, the diffuse reflection loss function $Loss_{diffuse}$ and the specular reflection loss function $Loss_{specular}$ are used, and in actual use, while obtaining the normal vector, the material feature information is obtained;

(7) obtaining a texture map of the three-dimensional object according to the material feature information.

Further, in the step (7), said obtaining the texture map of the three-dimensional object according to the material feature information includes:

(7.1) after sampling a target three-dimensional object by a camera at m angles, taking the sampled photos as input, to obtain a three-dimensional mesh; for each vertex, selecting a sampling angle ω that minimizes $n_i \cdot \omega_o$ and makes the vertex visible, $n_i$ represents a normal vector of the vertex of the three-dimensional mesh, and $\omega_o$ represents the emission vector in the world coordinate system;

(7.2) taking the three-dimensional mesh of the three-dimensional object as input, to obtain a mapping relationship diagram from the texture map to the mesh;

(7.3) mapping each effective pixel on the mapping relationship diagram to the sampling angle ω; fitting the material parameter in combination with the material feature $v_i$ of a point obtained by the neural network; and traversing all effective pixels on the mapping relationship diagram to obtain a final texture map.

Further, in the step (7.3), an L-BFGS-B method is used to fit the material parameters, and it is expressed as follows:

$$\text{minimize}(\|v_i - NN[f_r(\omega_i; \omega_o, n', t, p')]\|)$$

where p' and t are fitting parameters, p' denotes a material parameter vector, t represents the direction of the x-axis of the local coordinate system of the sampling point in the world coordinate system, n' is a normal vector predicted by the neural network, and NN represents mapping of the neural network.

A method for optimizing a three-dimensional mesh using normal vectors, and the method includes following steps:

(1) sampling a target three-dimensional object by a camera at m angles, irradiating by using, at each angle, the illumination pattern obtained from the training by the method according to claim 1, and taking sampled photos as input to obtain an initial three-dimensional point cloud and a three-dimensional mesh, wherein each vertex of the three-dimensional mesh has an initial normal vector $n_i$;

(2) remeshing the three-dimensional mesh obtained in the step (1);

(3) for each vertex, selecting a sampling angle ω that minimizes $n_i \cdot \omega_o$ and makes a sampling point visible, and under the sampling angle, obtaining a normal vector prediction value $n'_i$ through the method according to claim 1, and taking it as the normal vector $n_i$ of the sampling point;

(4) transforming each vertex position $P_i$ in a current mesh to a new position $P'_i$ to obtain a new mesh, wherein said transforming each vertex position $P_i$ in the current mesh to the new position $P'_i$ to obtain the new mesh including optimizing a normal vector loss function $L_{normal}$ and a vertex position loss function $L_{position}$; and combining $L_{normal}$ and $L_{position}$ to obtain a joint loss function $L_{opt}$, and optimizing $L_{opt}$ using a least squares method; and (5) returning to the step (3) until $L_{opt}$ converges, to complete optimization of the three-dimensional mesh, and taking the optimized three-dimensional mesh as a final geometric model.

Further, in the step (4), the normal vector loss function $L_{normal}$: taking a polygon $\{e'_0, e'_1, \ldots, e'_k\}$ as approximation of a tangent plane, where k is greater than 2, $e'_j$ denotes a j-th side of the polygon, and the polygon has a center of $P'_i$ and is formed by vertices adjacent to $P'_i$ and the loss function $L_{normal}$ is expressed as follows:

$$L_{normal} = \sum_{i=0}^{n} \sum_{j=0}^{k} (n_i \cdot e'_j)^2,$$

n is a number of vertices of the three-dimensional mesh; a loss function $L_{position}$ at the vertex:

$$L_{position} = \sum_{i=0}^{n} \|M_i(P'_i - P_i)\|^2,$$

where $M_i = \alpha n_i n_i^T + \beta(I - n_i n_i^T)$, I denotes a unit matrix, α and β are preset parameters $\alpha, \beta \in [0, +\infty)$, and a joint loss function $L_{opt}$ corresponding to a new position $P'_i$ is optimized by adjusting α and β;

the joint loss function $L_{opt}$:

$$L_{opt} = \lambda L_{position} + (1 - \lambda) L_{normal},$$

where $\lambda \in [0, 1]$ and λ is used to control weights of the two loss functions.

Beneficial effects of the present disclosure are as follows. The present disclosure provides, based on an idea of "actively irradiating an object with a number of specific patterns, capturing photos at the same time, and obtaining a normal vector of an object by calculating the obtained photos", an acquisition method combined with a neural network. An average error of the normal vector obtained by this method is 3°, which is much higher than an accuracy in the related art. Further, the method uses the obtained normal vector to optimize a model of the object. This method can also obtain material feature information while obtaining the normal vector, to finally obtain a high-quality geometric result and a high-quality material acquisition result jointly. Obtaining the material feature information does not need to assume that the spatial position is known. The model and the material of the three-dimensional object that are obtained jointly have a strong sense of reality, which is higher than a current level. The number of the illumination patterns obtained by using this method is small, and the normal vector obtained by the method has high accuracy and the method is not limited to a specific acquisition device. In addition, the method to obtain an illumination matrix can directly ensure that a generated matrix is effective.

DESCRIPTION OF EMBODIMENTS

Figure 1:
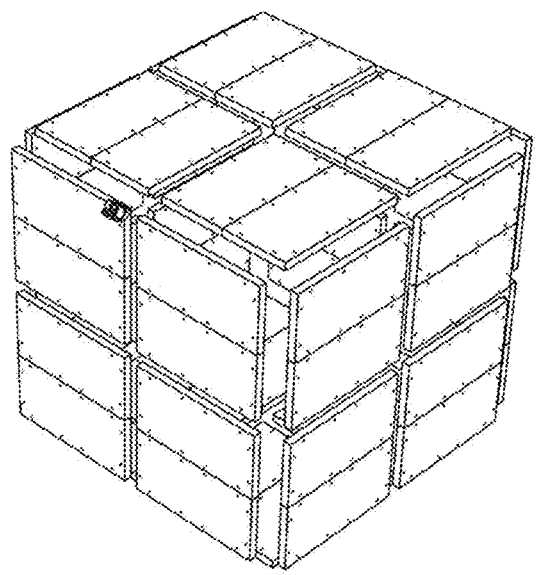
FIG. 1 is a three-dimensional view of an acquisition device according to an embodiment.

To make the objectives, technical solutions and advantages of the present disclosure clearer, the present disclosure will be further described in detail below with reference to the drawings and specific embodiments.

The present disclosure provides an acquisition method combined with neural networks based on an idea of "actively irradiating an object with a number of specific patterns, and capturing images simultaneously, and obtaining a normal vector of the object by calculating the obtained images. Further, the method uses the obtained normal vector to optimize a model of the object. The method can also obtain material feature information while obtaining the normal vector. Finally, a high-quality geometric result and a high-quality material acquisition result are obtained jointly. The specific implementation of the three parts is described in detail below:

1. A method for obtaining a normal vector of a three-dimensional object based on a neural network, the method includes following steps:

(1) generating training data: obtaining parameters of an acquisition device, the parameters including a distance from a light source to an origin of sampling space (space used to place an acquisition object in the acquisition device), an angle from the light source to the origin of the sampling space, a characteristic curve of the light source, a distance from a camera to the origin of the sampling space, an angle from the camera to the origin of the sampling space, and an intrinsic parameter and an extrinsic parameter of the camera; and generating, utilizing the parameters, an acquisition result that simulates an actual camera, as training data; a specific method for generating the acquisition result that simulates the actual camera is as follows:

randomly selecting a sampling point in the sampling space where a target three-dimensional object may appear, randomly sampling material parameters of the sampling point, and generating the Lumitexel using a rendering model, where an incident light from each light source is incident to a sampling point and then is reflected by the sampling point along an observation direction to form a reflected light having a light intensity, and the Lumitexel denotes the light intensity; the rendering model can adopt a GGX model but is not limited to this and is generated through a formula:

$$f_r(\omega_i; \omega_o, n, t, p) = \frac{\rho_d}{\pi} + \rho_s \frac{D_{GGX}(\omega_h; \alpha_x, \alpha_y; t) F(\omega_i, \omega_h) G_{GGX}(\omega_i, \omega_o; \alpha_x, \alpha_y; t)}{4(\omega_i \cdot n)(\omega_o \cdot n)},$$

where $f_r(\omega_i; \omega_o, n, t, p)$ denotes a bidirectional reflection distribution function, $\omega_o$ denotes an emission direction, $\omega_i$ denotes an incident direction, n denotes a normal vector in a world coordinate system, t denotes a direction of an x-axis of a local coordinate system of a sampling point in the world coordinate system, p denotes a material parameter vector and includes $\alpha_x, \alpha_y, \rho_d, \rho_s$, where $\alpha_x$ and $\alpha_y$ denote roughness coefficients, $\rho_d$ denotes a diffuse albedo, and $\rho_s$ denotes a specular albedo; $\omega_h$ denotes a half vector, $D_{GGX}$ denotes a differential surface distribution term, F denotes a Fresnel term, and $D_{GGX}$ denotes a shadow coefficient function;

(2) training the neural network according to the training data obtained in the step (1), and the neural network has following characteristics:

a. input of the neural network being a Lumitexel;

b. output of the neural network and a regression target being normal vectors corresponding to the Lumitexel input;

c. a first layer of the neural network including a linear fully connected layer, where a parameter matrix of the linear fully connected layer is trained by a following formula:

$$W_l = f_w(W_{raw})$$

where $W_{raw}$ denotes a parameter to be trained; $W_l$ is an illumination matrix, with a size of n×m, n is sampling accuracy of Lumitexel (that is, the number of the light sources of the acquisition device), m is the number of illumination patterns; $f_w$ is a mapping, which is used to transform $W_{raw}$, so that the generated illumination matrix is capable of corresponding to a possible luminous intensity of the acquisition device (that is, it has physical meaning); a matrix size of $W_{raw}$ and a value range of each element thereof depends on the actually used $f_w$, $f_w$ can be a combination of normalization function and flip function, and in this case, it is required that m is an even number, the size of $W_{raw}$ is n×ṁ, ṁ=m/2, $W_{raw}$, can be regarded as a combination of ṁ column vectors and is expressed as follows:

$$W_{raw} = [w_1, w_2, \ldots, w_{\dot{m}}]$$

$f_w$ normalizes each column of $W_{raw}$ to be a unit vector and then flips each column to its negative number so as to form a new vector, and a formula of $f_w$ is expressed as follows:

$$f_w(W_{raw}) = f_{flip}(f_{normalize}(W_{raw})),$$

$$W_{normalized} = f_{normalize}(W_{raw}) = \left[\frac{w_1}{\|w_1\|}, \frac{w_2}{\|w_2\|} \ldots \frac{w_{\dot{m}}}{\|w_{\dot{m}}\|}\right],$$

$W_{normalized}$ can be regarded as ṁ column vectors, and it is expressed as follows:

$$W_{normalized} = [\overline{w}_1, \overline{w}_2, \ldots, \overline{w}_{\dot{m}}],$$

$$W_l = f_{flip}(W_{normalized}) = [\max(0.0, \overline{w}_1), \min(0.0, \overline{w}_1), \max(0.0, \overline{w}_2), \min(0.0, \overline{w}_1) \ldots, \max(0.0, \overline{w}_{\dot{m}}), \min(0.0, \overline{w}_{\dot{m}})].$$

d. a second layer and subsequent layers being non-linear mapping networks, and a length of an output vector of a last layer is 3, for example, one normalization layer is connected to the last layer of the neural network and is configured to normalize the output vector to be a unit vector; and after the training, the illumination matrix of the first linear fully connected layer of the first layer being taken out;

(3) generating, by the acquisition device, an illumination pattern based on the illumination matrix taken out in step (2), and irradiating a target three-dimensional object in sequence, to obtain a set of photos $r_1, r_2 \ldots, r_m$; traversing pixels and channels of the photos in turn, taking out pixel values of an i-th row, a j-th column, and a k-th channel from each of the $r_1, r_2 \ldots, r_m$ each time, to form a vector $a = a_1, a_2, \ldots, a_m$, taking a as an output vector of the linear fully connected layer of the first layer of the neural network, calculating the output vector of the last layer as a normal vector of a surface of the three-dimensional object corresponding to one of the pixels; and traversing all of the pixels to obtain a feature map of the normal vector of the surface of the three-dimensional object.

2. A method for obtaining a material of a three-dimensional object based on a neural network, the method is specifically as follows:

adding prediction of material feature information (such as a diffuse reflection feature vector, a specular reflection feature vector) in the training of the above neural network. The specific method is as follows:

(1) surrounding a sampling point using a cube with a side length d and with a center at the origin of the sampling space, and uniformly sampling a plurality of points on each surface as virtual light sources, where the virtual light source is a point light source, and the number of the virtual light sources on the cube is referred to a sampling accuracy of the feature vector, and the use of the virtual light sources can eliminate an adverse effect caused by possible gaps between the light sources of the acquisition device.

(2) a formula for generating the material feature vector being as follows:

$$V(l, P) = F_{near}(x_l, x_p, \omega_p, n_l) I(l) f_r(\omega_i; \omega_o, n_p, t, p),$$

where I denotes luminescence information of each of the virtual light sources l and includes: a spatial position $x_l$ of the virtual light source l, a normal vector $n_l$ of the virtual light source l, a luminous intensity I(l) of the virtual light source l; and P includes parameter information of the sampling point, including: a spatial position $x_p$ of the sampling point, a normal vector $n_p$ in a world coordinate system, a material parameter p of the sampling point in a direction t of an x-axis of a local coordinate system in the world coordinate system, and p includes $\alpha_x$, $\alpha_y$, $\rho_d$, $\rho_s$, where $\alpha_x$ and $\alpha_y$ represent roughness coefficients, $\rho_d$ represents a diffuse albedo, $\rho_s$ represents a specular albedo; $\omega_i$ represents an incident vector in the world coordinate system, $\omega_o$ represents an emission vector in the world coordinate system; $f_r(\omega_i; \omega_o, n_p, t, p)$ denotes a bidirectional reflection distribution function, $F_{near}(x_l, x_p, \omega_i, n_p, n_l)$ is a near field factor and is represented by a formula:

$$F_{near}(x_l, x_p, \omega_i, n_p, n_l) = \frac{1}{\|x_l - x_p\|^2}(\omega_i \cdot n_p)(-\omega_i \cdot n_l);$$

(3) using the above formula to set the specular albedo of the sampling point to 0, to generate a diffuse reflection feature vector $v_d$;

(4) using the above formula to set the diffuse albedo to 0, to generate a specular reflection feature vector $v_s$;

(5) additionally outputting, by the neural network, vectors $v'_d$, $v'_s$, p', where $v'_d$ has a same length as $v_d$, $v'_s$ has a same length as $v_s$, p' has a length of 3, the vectors $v'_d$, $v'_s$ and p' are respectively a prediction of the diffuse reflection feature vector $v_d$ after the near field factor is eliminated, a prediction of the specular reflection vector $v_s$ after the near field factor is eliminated, and a prediction of the spatial position $x_p$;

(6) A loss function of a material feature part being expressed as follows:

$$\text{Loss}_{diffuse} = \|V'_d F_{near}(x_b p', \omega'_p n', n_l) - v_d\|,$$

$$\text{Loss}_{specular} = \|v'_s F_{near}(x_b p', \omega'_p n' n_l) - v_s\|,$$

when training the neural network, the diffuse reflection loss function $\text{Loss}_{diffuse}$ and the specular reflection loss function $\text{Loss}_{specular}$ are used, and in actual use, while obtaining the normal vector, the material feature information can be obtained; and (7) obtaining a texture map of the three-dimensional object according to the material feature information, and a process of obtaining the texture map of the three-dimensional object according to the material feature information includes:

(7.1) after sampling a target three-dimensional object by a camera at m angles, taking the sampled photos as input, and obtain a three-dimensional mesh using a public tool COLMAP in the industry, for each vertex, selecting a sampling angle co that minimizes $n_i \cdot \omega_o$ and makes the vertex visible, where $n_i$ denotes the normal vector of the vertex of the three-dimensional mesh, and $\omega_o$ represents the emission vector in the world coordinate system;

(7.2) using a public tool Iso-charts in the field, to take the three-dimensional mesh of the three-dimensional object as input and to obtain a mapping relationship diagram from the texture map to the mesh (hereinafter referred to as the mapping relationship diagram); and (7.3) mapping each effective pixel on the mapping relationship diagram to the sampling angle ω; using a L-BFGS-B method to fit the material parameters in combination with the material feature $v_i$ (including the diffuse reflection feature and the specular reflection feature) of a point obtained by the neural network, which is expressed as follows:

$$\text{minimize}(\|v_i - NN[f_r(\omega_i; \omega_o, n', t, p')]\|)$$

where p' and t are fitting parameters, p' denotes a material parameter vector, t represents the direction of the x-axis of the local coordinate system of the sampling point in the world coordinate system, n' denotes a normal vector predicted by the neural network, and NN represents mapping of the neural network; and after traversing all the effective pixels on the mapping relationship diagram, a final texture map is obtained, and the fitting method at this stage is not limited to the L-BFGS-B method.

3. A method for optimizing a three-dimensional mesh using normal vectors. The method includes following steps:

(1) sampling m angles of the target three-dimensional object through a camera, using, at each angle, the illumination pattern obtained from the training of the first part to irradiate, taking sampled photos as input, and using COLMAP, a public tool in the industry, so that an initial three-dimensional point cloud and a three-dimensional mesh can be obtained, and each vertex of the three-dimensional mesh has an initial normal vector $n_i$;

(2) remeshing the three-dimensional mesh obtained in step (1), for example, using the Delaunay triangulation;

(3) for each vertex, selecting the sampling angle co that minimizes $n_i \cdot \omega_o$ and makes the point visible, and under this sampling angle, obtaining a normal vector prediction value $n'_i$ through the three-dimensional object normal vector acquisition method based on the neural network, and taking it as the normal vector $n_i$ of the point; and (4) transforming each vertex position $P_i$ in a current mesh to a new position $P'_i$ to obtain a new mesh, and this process includes optimizing of a normal vector loss function $L_{normal}$ and a vertex position loss function $L_{position}$.

The normal vector loss function $L_{normal}$ uses a property that the normal vector and a tangent plane are perpendicular to each other, to limit a tangent plane of $P'_i$ in the new mesh to be perpendicular to the corresponding normal vector $n_i$, in order to improve an operating efficiency, a polygon $\{e'_0, e'_1, \ldots, e'_k\}$ is taken as approximation of the tangent plane, and k is greater than 2, where $e'_j$ is the j-th side of the polygon, the polygon has a center of $P'_i$ and is composed of vertices adjacent to $P'_i$, and the loss function $L_{normal}$ is expressed as follows:

$$L_{normal} = \sum_{i=0}^{n} \sum_{j=0}^{k} (n_i \cdot e'_j)^2,$$

where n is the number of the vertices of the three-dimensional mesh.

At the same time, it is necessary to limit the new position $P'_i$ to avoid generating singularity, so movement of the new position in a direction of the normal vector is required to have a greater degree of freedom, while degree of freedom in a tangential direction is relatively small, then there is a loss function $L_{position}$:

$$L_{position} = \sum_{i=0}^{n} \|M_i(P'_i - P_i)\|^2,$$

where $M_i = \alpha n_i n_i^T + \beta(I - n_i n_i^T)$, I denotes a unit matrix, $\alpha$ and $\beta$ are preset parameters $\alpha, \beta \in [0, +\infty)$, and a joint loss function $L_{opt}$ corresponding to the new position $P'_i$ is optimized by adjusting α and β. (for example, values are a relatively small α and a relatively large β). $L_{normal}$ and $L_{position}$ are combined to obtain the joint loss function $L_{opt}$, and a least square method is used to optimize $L_{opt}$;

$$L_{opt}=\lambda L_{position}+(1-\lambda)L_{normal},$$

where, λ∈[0,1] and λ is used to control weights of the two loss functions (a value can be selected from [0.1, 0.3]);

(5). returning to the step (3) until $L_{opt}$ converges, to complete the optimization of the three-dimensional mesh, and using the three-dimensional mesh as a final geometric model, where the optimized three-dimensional mesh can be applied in step (7) of the second part to obtain a high-quality material result.

Figure 2:
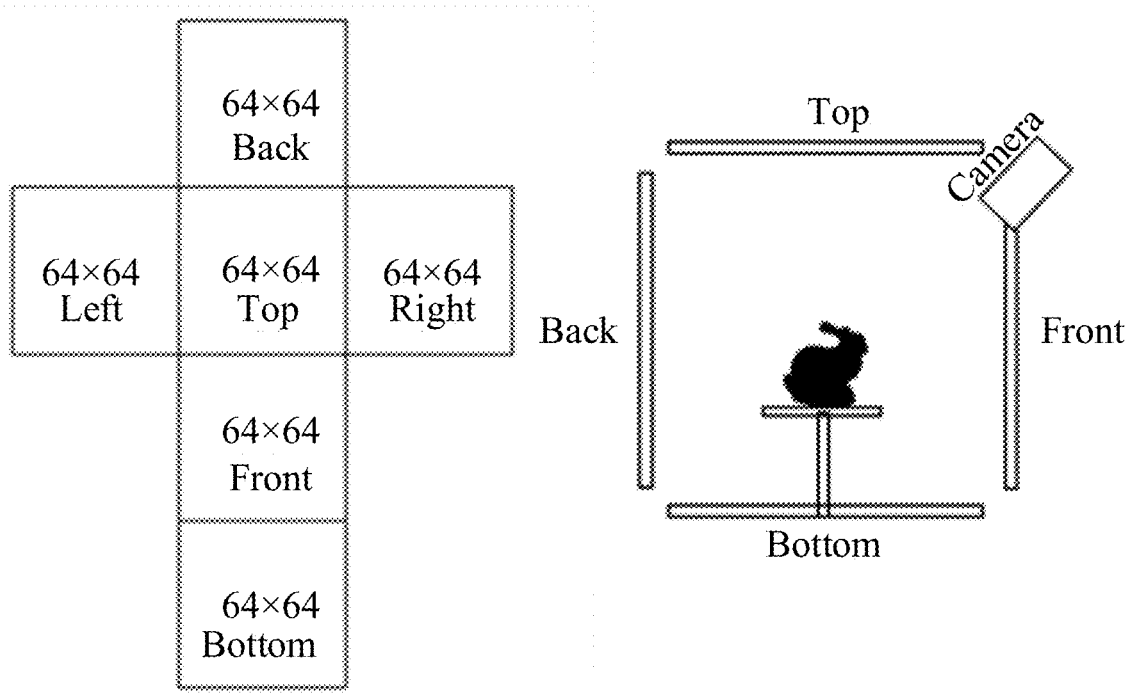
In FIG. 2, (a) is an expanded plan view of an acquisition device in an embodiment, 64×64 is the number of light sources on each surface, and (b) is a side view thereof.

A specific example of the acquisition device is given below, as shown in FIGS. 1 and 2, the acquisition device includes 48 light boards, and a camera is fixed on an upper part and configured to capture images. There is a rotating platform driven by a stepping motor in the center of the device and is used to place sampling objects. LED lamp beads are densely arranged on each lamp board, and there are a total of 20480 LED lamp beads. The lamp bead is controlled by FPGA, which can adjust luminous brightness and luminous time.

Figure 4:
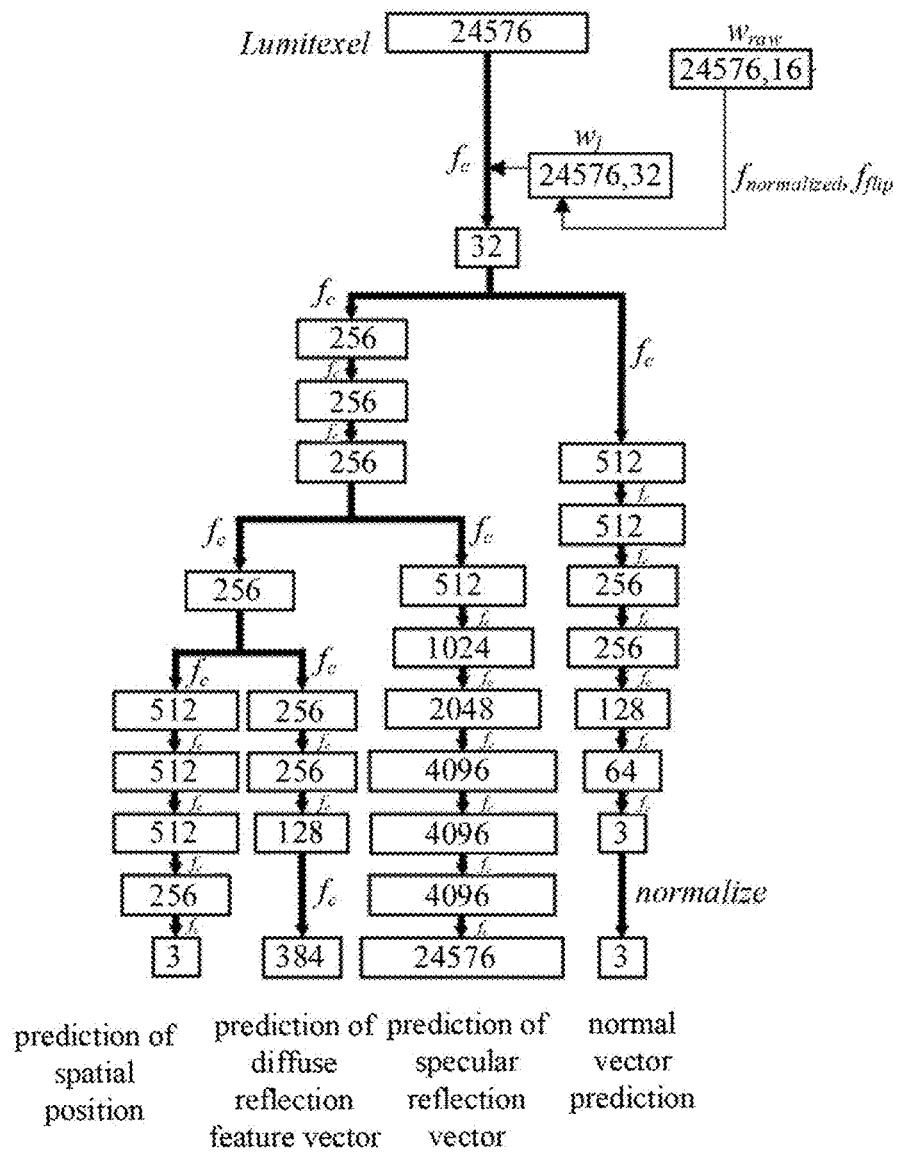
FIG. 4 is a schematic diagram of a neural network according to an embodiment.

An example of an acquisition system to which the method of the present disclosure is applied is given below, and the system is generally divided into following modules: a preparation module, an acquisition module, and a recovery module. The preparation module includes two parts to provide data sets for network training and using a GGX BRDF model, where a set of BRDF parameters, the spatial position of the point, and the camera position are input to obtain a Lumitexel. The network training part uses a Tensorflow open source framework, depicts the network as shown in the drawing, and uses an Adam optimizer for training. The network structure is shown in FIG. 4, each rectangle represents a layer of neurons, and the number in the rectangle represents the number of neurons in that layer. The leftmost layer is an input layer, and the rightmost layer is an output layer. Full connection is used between layers. The device of the acquisition module is as shown in FIG. 1 and FIG. 2, and the specific structure has been described above. The recovery module is configured to load the trained neural network, and first calculate the normal vector information and the material feature vector. After using the COLMAP software to obtain a rough three-dimensional mesh, the method described above is used to optimize. The mapping relationship diagram is calculated according to the optimized geometric model. For each effective pixel on the mapping relationship diagram, the material parameters are fitted.

Figure 3:
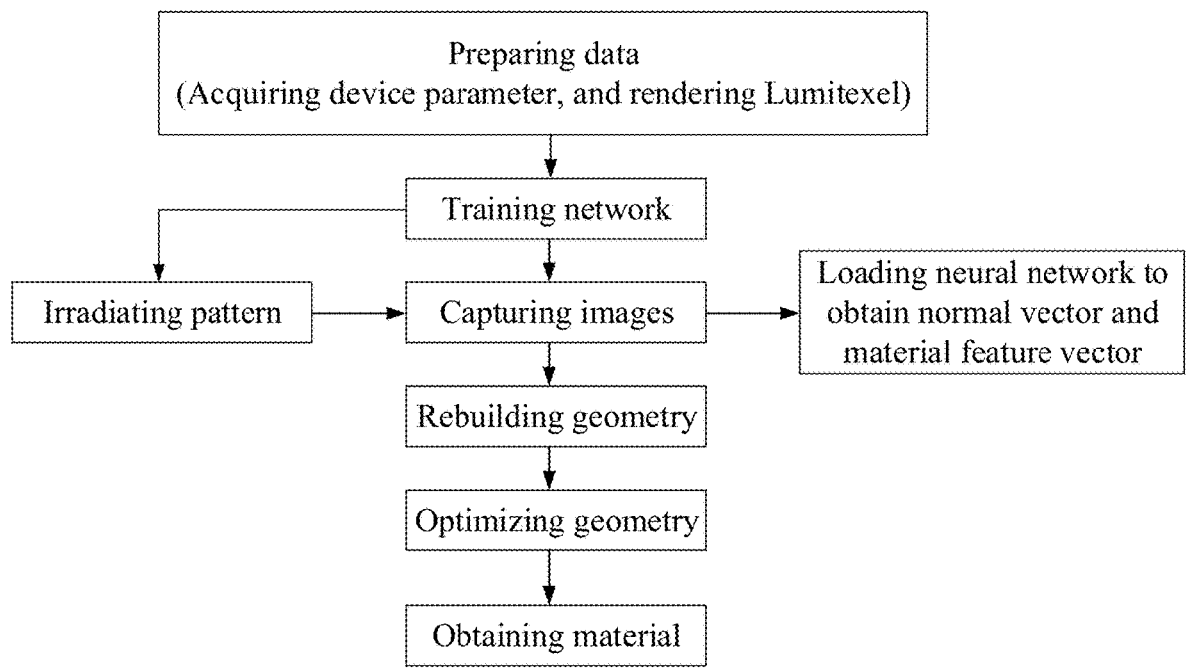
FIG. 3 is a flow chart of an implementation process of an embodiment.
Figure 5:
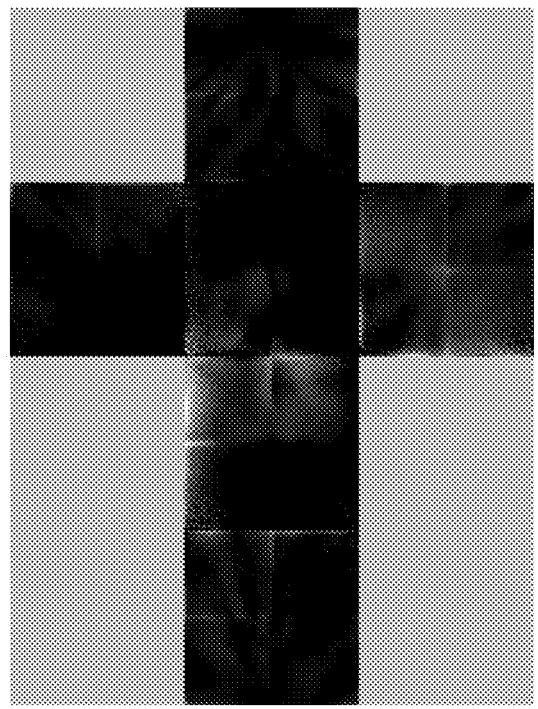
FIG. 5 illustrates one of illumination patterns obtained through training according to an embodiment.
Figure 6:
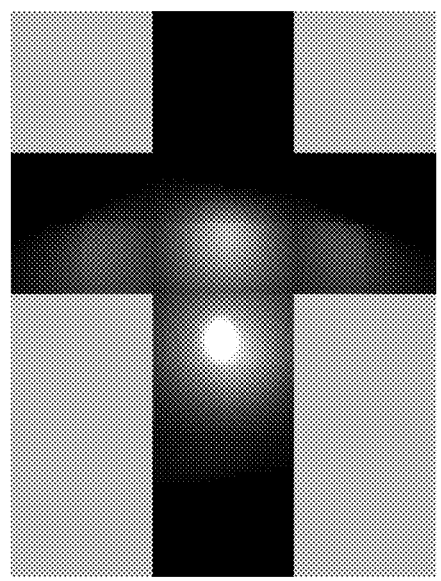
FIG. 6 illustrates a typical Lumitexel for training according to an embodiment.

FIG. 3 is a working flow according to an embodiment. First, training data is generated, 200 million Lumitexels are randomly sampled, 80% of the Lumitexels are taken to form the training set, and using the rest of the Lumitexels as a validation set. When training the network, a Xavier method is used to initialize the parameters, and a learning rate is 1e-4. The number of shots for the target is 32, so the size of the illumination matrix is: (20480, 32). After training, taking out the illumination matrix as the illumination pattern, and parameters of each column specify the luminous intensity of the lamp at that position, and FIG. 5 shows an illumination pattern obtained by the training. The object is sampled at 24 angles, and at each angle, 32 shots are performed according to the luminous intensity of the illumination pattern to get the acquisition result. For each point on the captured image, the pixel values of the images captured by 32 times are combined, to form a vector. A subsequent processing method is as follows: 1. loading the parameters after the second layer of the network, and taking the acquired vector as input, to recover to obtain the spatial position, normal vector information and diffuse reflection information at each position; 2. using the COLMAP open source software to perform geometric restoration, to obtain a point cloud and a three-dimensional mesh; 3. using the above normal vector acquisition method to take the obtained geometry and predicted normal vector as input, to iterate and optimize the geometry; 4. using Isochart to get the mapping relationship diagram; and 5. for each effective pixel on the mapping relationship diagram, finding out corresponding real shot data, to recover the diffuse reflection feature vector and the specular reflection feature vector. A fitting module fits, using the L-BFGS-B method, BRDF parameters for each pixel of the acquired point.

The above are only some embodiments of the present disclosure, and the present disclosure is not limited to the above-mentioned embodiments, as long as the same means are used to achieve the technical effects of the present disclosure, they should fall within the protection scope of the present disclosure. Within the protection scope of the present disclosure, its technical solutions and/or implementation manners can have various modifications and changes.

What is claimed is:

1. A method for obtaining a normal vector of a three-dimensional object based on a neural network, comprising following steps:

(1) generating training data,
   wherein said generating the training data comprises: obtaining parameters of an acquisition device, the parameters comprising a distance from a light source to an origin of sampling space, an angle from the light source to the origin of the sampling space, a characteristic curve of the light source, a distance from a camera to the origin of the sampling space, an angle from the camera to the origin of the sampling space, and an intrinsic parameter and an extrinsic parameter of the camera; and generating, utilizing the parameters, an acquisition result that simulates an actual camera, as training data;

(2) training the neural network based on the training data obtained in the step (1), wherein the neural network has following characteristics:
   a. input of the neural network being a Lumitexel, wherein an incident light from each light source is incident to a sampling point along an observation direction and then is reflected by the sampling point along an observation direction to form a reflected light having a light intensity, and the Lumitexel denotes the light intensity;
   b. output of the neural network and a regression target being normal vectors corresponding to the Lumitexel input;
   c. a first layer of the neural network comprising a linear fully connected layer, wherein a parameter matrix of the linear fully connected layer is trained by a following formula:

$$W_l=f_w(W_{raw}),$$

where $W_{raw}$ denotes a parameter to be trained; $W_l$ denotes an illumination matrix with a size of n×m, n is sampling accuracy of the Lumitexel, m denotes a number of illumination patterns; and $f_w$ denotes a mapping used to transform $W_{raw}$, so that the generated illumination matrix is capable of corresponding to a possible luminous intensity of the acquisition device; and d. a second layer and subsequent layers being non-linear mapping networks, and a length of an output vector of a last layer is 3; and after the training, the illumination matrix of the linear fully connected layer of the first layer being taken out; and (3) generating, by the acquisition device, an illumination pattern based on the illumination matrix taken out in the step (2), and irradiating a target three-dimensional object in sequence, to obtain a set of photos $r_1$, $r_2 \ldots, r_m$; traversing pixels and channels of the photos in turn, taking out pixel values of an i-th row, a j-th column, and a k-th channel from each of the $r_1$, $r_2, \ldots, r_m$ each time, to form a vector $a=a_1, a_2, \ldots, a_m$, taking a as an output vector of the linear fully connected layer of the first layer of the neural network, calculating the output vector of the last layer as a normal vector of a surface of the three-dimensional object corresponding to one of the pixels; and traversing all of the pixels to obtain a feature map of the normal vector of the surface of the three-dimensional object.

2. The method for obtaining the normal vector of the three-dimensional object based on the neural network according to claim 1, wherein in the step (1), said generating the acquisition result that simulates the actual camera comprises: randomly selecting a sampling point in the sampling space where the target three-dimensional object may appear, randomly sampling material parameters of the sampling point, and generating the Lumitexel using a rendering model.

3. The method for obtaining the normal vector of the three-dimensional object based on the neural network according to claim 2, wherein the rendering model adopts a GGX model and is generated through a formula:

$$f_r(\omega_i; \omega_o, n, t, p) = \frac{\rho_d}{\pi} + \rho_s \frac{D_{GGX}(\omega_h; \alpha_x, \alpha_y; t) F(\omega_i, \omega_h) G_{GGX}(\omega_i, \omega_o; \alpha_x, \alpha_y; t)}{4(\omega_i \cdot n)(\omega_o \cdot n)},$$

where $f_r(\omega_i; \omega_o, n, t, p)$ denotes a bidirectional reflection distribution function, $\omega_o$ denotes an emission direction, $\omega_i$ denotes an incident direction, n denotes a normal vector in a world coordinate system, t denotes a direction of an x-axis of a local coordinate system of a sampling point in the world coordinate system, p denotes a material parameter vector and comprises $\alpha_x, \alpha_y, \rho_d, \rho_s$, where $\alpha_x$ and $\alpha_y$ denote roughness coefficients, $\rho_d$ denotes a diffuse albedo, and $\rho_s$ denotes a specular albedo; $\omega_h$ denotes a half vector, $D_{GGX}$ denotes a differential surface distribution term, F denotes a Fresnel term, and $D_{GGX}$ denotes a shadow coefficient function.

4. The method for obtaining the normal vector of the three-dimensional object based on the neural network according to claim 1, wherein in the step (2), the mapping $f_w$ is a combination of a normalization function and a flip function, m is an even number, a size of $W_{raw}$ is n×ṁ, ṁ=m/2, $W_{raw}$ is regarded as a combination of ṁ column vectors and is expressed as follows:

$$W_{raw} = [w_1, w_2, \ldots, w_{\dot{m}}]$$

$f_w$ normalizes each column of $W_{raw}$ to be a unit vector and then flips each column to its negative number so as to form a new vector, and a formula of $f_w$ is expressed as follows:

$$f_w(W_{raw}) = f_{flip}(f_{normalize}(W_{raw})),$$

$$W_{normalized} = f_{normalize}(W_{raw}) = \left[\frac{w_1}{\|w_1\|}, \frac{w_2}{\|w_2\|} \ldots \frac{w_{\dot{m}}}{\|w_{\dot{m}}\|}\right],$$

$W_{normalized}$ is regarded as m column vectors and is expressed as follows:

$$W_{normalized} = [\overline{w}_1, \overline{w}_2, \ldots, \overline{w}_m],$$

$$W_l = f_{flip}(W_{normalized}) = [\max(0.0, \overline{w}_1), \min(0.0, \overline{w}_1), \max(0.0, \overline{w}_2), \min(0.0, \overline{w}_1) \ldots, \max(0.0, \overline{w}_m), \min(0.0, \overline{w}_m)].$$

5. The method for obtaining the normal vector of the three-dimensional object based on the neural network according to claim 1, wherein in the step (2), one normalization layer is connected to the last layer of the neural network and is configured to normalize the output vector to be a unit vector.

6. A method for obtaining a material of a three-dimensional object based on a neural network, wherein prediction of material feature information is added in the training of the neural network according to claim 1, wherein the method for obtaining the material of the three-dimensional object based on the neural network comprises following steps:

(1) surrounding a sampling point using a cube with a side length d and with a center at the origin of the sampling space, and uniformly sampling a plurality of points on each surface as virtual light sources;

(2) generating the material feature vector through a formula:

$$V(l,P) = F_{near}(x_l, x_p, \omega_p, n_l) l(l) f_r(\omega_i; \omega_o, n_p, t, p),$$

where l denotes luminescence information of each of the virtual light sources l and comprises: a spatial position $x_l$ of the virtual light source l, a normal vector $n_l$ of the virtual light source l, a luminous intensity l(l) of the virtual light source l; and P comprises parameter information of the sampling point, including: a spatial position $x_p$ of the sampling point, a normal vector $n_p$ in a world coordinate system, a material parameter p of the sampling point in a direction t of an x-axis of a local coordinate system in the world coordinate system, and p comprises $\alpha_x, \alpha_y, \rho_d, \rho_s$, where $\alpha_x$ and $\alpha_y$ represent roughness coefficients, $\rho_d$ represents a diffuse albedo, $\rho_s$ represents a specular albedo; $\omega_i$ represents an incident vector in the world coordinate system, $\omega_o$ represents an emission vector in the world coordinate system; $f_r(\omega_i; \omega_i n_p, t, p)$ is a bidirectional reflection distribution function, $F_{near}(x_l, x_p, \omega_i, n_p, n_l)$ is a near field factor and is represented by a formula:

$$F_{near}(x_l, x_p, \omega_i, n_p, n_l) = \frac{1}{\|x_l - x_p\|^2}(\omega_i \cdot n_p)(-\omega_i \cdot n_l),$$

(3) setting the specular albedo of the sampling point to 0, to generate a diffuse reflection feature vector $v_d$;

(4) setting the diffuse albedo to 0, to generate a specular reflection feature vector $v_s$;

(5) additionally outputting, by the neural network, vectors $v'_d, v'_s, p'$, where $v'_d$ has a same length as $v_d$, $v'_s$ has a same length as $v_s$, p' has a length of 3, the vectors $v'_d$, $v'_s$, and p' are respectively a prediction of the diffuse reflection feature vector $v_d$ after the near field factor is eliminated, a prediction of the specular reflection vector $v_s$ after the near field factor is eliminated, and a prediction of the spatial position $x_p$;

(6) a loss function of a material feature being expressed as follows:

$$\text{Loss}_{diffuse}=\|V'_d F_{near}(x_p p', \omega'_p n', n_l) - v_d\|,$$

$$\text{Loss}_{specular}=\|v'_s F_{near}(x_p p', \omega'_p n' n_l) - v_s\|,$$

wherein when training the neural network, the diffuse reflection loss function $\text{Loss}_{diffuse}$ and the specular reflection loss function $\text{Loss}_{specular}$ are used, and in actual use, while obtaining the normal vector, the material feature information is obtained; and (7) obtaining a texture map of the three-dimensional object according to the material feature information.

7. The method for obtaining the material of the three-dimensional object based on the neural network according to claim 6, wherein in the step (7), said obtaining the texture map of the three-dimensional object according to the material feature information comprises:

(7.1) after sampling a target three-dimensional object by a camera at m angles, taking the sampled photos as input, to obtain a three-dimensional mesh; and for each vertex, selecting a sampling angle co that minimizes $n_i \cdot \omega_o$ and makes the vertex visible, where $n_i$ represents a normal vector of the vertex of the three-dimensional mesh, and coo represents the emission vector in the world coordinate system;

(7.2) taking the three-dimensional mesh of the three-dimensional object as input, to obtain a mapping relationship diagram from the texture map to the mesh; and (7.3) mapping each effective pixel on the mapping relationship diagram to the sampling angle ω; fitting the material parameter in combination with the material feature $v_i$ of a point obtained by the neural network; and traversing all effective pixels on the mapping relationship diagram to obtain a final texture map.

8. The method for obtaining the material of the three-dimensional object based on the neural network according to claim 7, wherein in the step (7.3), an L-BFGS-B method is used to fit the material parameters, and it is expressed as follows:

$$\text{minimize}(\|v_i - NN[f_r(\omega_i; \omega_o, n', t, p')]\|)$$

where p' and t are fitting parameters, p' denotes a material parameter vector, t represents the direction of the x-axis of the local coordinate system of the sampling point in the world coordinate system, n' denotes a normal vector predicted by the neural network, and NN represents mapping of the neural network.

9. A method for optimizing a three-dimensional mesh using a normal vector, comprising following steps:

(1) sampling a target three-dimensional object by a camera at m angles, irradiating by using, at each angle, the illumination pattern obtained from the training by the method according to claim 1, and taking sampled photos as input to obtain an initial three-dimensional point cloud and a three-dimensional mesh, wherein each vertex of the three-dimensional mesh has an initial normal vector $n_i$;

(2) remeshing the three-dimensional mesh obtained in the step (1);

(3) for each vertex, selecting a sampling angle co that minimizes $n_i \cdot \omega_o$ and makes a sampling point visible, and under the sampling angle, obtaining a normal vector prediction value $n'_i$ through the method according to claim 1, and taking it as the normal vector $n^i$ of the sampling point;

(4) transforming each vertex position $P_i$ in a current mesh to a new position $P'_i$ to obtain a new mesh, wherein said transforming each vertex position $P_i$ in the current mesh to the new position $P'_i$ to obtain the new mesh comprising optimizing a normal vector loss function $L_{normal}$ and a vertex position loss function $L_{position}$; and combining $L_{normal}$ and $L_{position}$ to obtain a joint loss function $L_{opt}$, and optimizing $L_{opt}$ using a least squares method; and (5) returning to the step (3) until $L_{opt}$ converges, to complete optimization of the three-dimensional mesh, and taking the optimized three-dimensional mesh as a final geometric model.

10. The method for optimizing the three-dimensional mesh using the normal vector according to claim 9, wherein in the step (4), the normal vector loss function $L_{normal}$ taking a polygon $\{e'_0, e'_1, \ldots, e'_k\}$ as approximation of a tangent plane, where k is greater than 2, $e'_j$ denotes a j-th side of the polygon, and the polygon has a center of $P'_i$ and is formed by vertices adjacent to $P'_i$; and the loss function $L_{normal}$ is expressed as follows:

$$L_{normal} = \sum_{i=0}^{n} \sum_{j=0}^{k} (n_i \cdot e'_j)^2,$$

where n is a number of vertices of the three-dimensional mesh;

a loss function $L_{position}$ at the vertex:

$$L_{position} = \sum_{i=0}^{n} \|M_i(P'_i - P_i)\|^2,$$

where $M_i = \alpha n_i n_i^T + \beta(I - n_i n_i^T)$, I denotes a unit matrix, $\alpha$ and $\beta$ are preset parameters $\alpha, \beta \in [0, +\infty)$, and a joint loss function $L_{opt}$ corresponding to a new position $P'_i$ is optimized by adjusting $\alpha$ and $\beta$;

the joint loss function $L_{opt}$:

$$L_{opt} = \lambda L_{position} + (1-\lambda) L_{normal},$$

where $\lambda \in [0,1]$ and $\lambda$ is used to control weights of the two loss functions.

\* \* \* \* \*